US009277185B2

(12) United States Patent
Lipton et al.

(10) Patent No.: US 9,277,185 B2
(45) Date of Patent: Mar. 1, 2016

(54) INTELLIGENT VIDEO VERIFICATION OF POINT OF SALE (POS) TRANSACTIONS

(75) Inventors: Alan J. Lipton, Herndon, VA (US); Péter L. Venetianer, McLean, VA (US); Li Yu, Sterling, VA (US); Yongtong Hu, Herndon, VA (US); W. Andrew Scanlon, Falls Church, VA (US); Zhong Zhang, Great Falls, VA (US); Weihong Yin, Herndon, VA (US)

(73) Assignee: Avigilon Fortress Corporation, Vancouver (CA)

( * ) Notice: Subject to any disclaimer, the term of this patent is extended or adjusted under 35 U.S.C. 154(b) by 445 days.

(21) Appl. No.: 13/082,686

(22) Filed: Apr. 8, 2011

(65) Prior Publication Data

US 2011/0191195 A1   Aug. 4, 2011

Related U.S. Application Data

(62) Division of application No. 11/802,895, filed on May 25, 2007, now Pat. No. 7,925,536.

(60) Provisional application No. 60/803,191, filed on May 25, 2006.

(51) Int. Cl.
*G06Q 20/00* (2012.01)
*H04N 7/18* (2006.01)
*G06Q 20/20* (2012.01)

(52) U.S. Cl.
CPC . *H04N 7/18* (2013.01); *G06Q 20/20* (2013.01)

(58) Field of Classification Search
CPC ............................... G06Q 20/40; G06Q 20/20
USPC ............................................................ 705/16
See application file for complete search history.

(56) References Cited

U.S. PATENT DOCUMENTS

| 6,847,393 | B2 * | 1/2005 | Ashe et al. ...................... 348/61 |
| 7,613,322 | B2 | 11/2009 | Yin et al. |
| 7,796,780 | B2 | 9/2010 | Lipton et al. |
| 7,801,330 | B2 | 9/2010 | Zhang et al. |
| 7,868,912 | B2 | 1/2011 | Venetianer et al. |
| 2004/0155960 | A1 * | 8/2004 | Wren et al. .................... 348/150 |
| 2005/0016367 | A1 * | 1/2005 | Hasenmaier .................... 84/723 |
| 2005/0146605 | A1 | 7/2005 | Lipton et al. |
| 2005/0162515 | A1 | 7/2005 | Venetianer et al. |
| 2005/0169367 | A1 * | 8/2005 | Venetianer et al. ...... 375/240.01 |
| 2006/0225120 | A1 * | 10/2006 | Lee et al. ...................... 725/131 |

(Continued)

OTHER PUBLICATIONS

C. Stauffer, W.E.L. Grimson, "Learning Patterns of Activity Using Real-Time Tracking," IEEE Transactions on Pattern Analysis and Machine Intelligence, vol. 22, No. 8, Aug. 2000, pp. 747-757.*

(Continued)

*Primary Examiner* — Seye Iwarere
(74) *Attorney, Agent, or Firm* — MH2 Technology Law Group, LLP

(57) ABSTRACT

A method of monitoring a point of sale (POS) transaction including: receiving non video data regarding the POS transaction; defining exceptional transaction rules based at least on predetermined non video POS data events; inferring a potentially exceptional transaction based on a corresponding exceptional transaction rule and the received POS non video data; and verifying the inferred potentially exceptional transaction with video data regarding a corresponding POS transaction.

11 Claims, 14 Drawing Sheets

(56) References Cited

U.S. PATENT DOCUMENTS

| | | |
|---|---|---|
| 2007/0058040 A1 | 3/2007 | Zhang et al. |
| 2007/0083424 A1* | 4/2007 | Lang et al. ............... 705/13 |
| 2009/0150246 A1* | 6/2009 | Meenakshi et al. ........... 705/16 |

OTHER PUBLICATIONS

R. Collins, A. Lipton, H. Fujiyoshi, and T. Kanade, "Algorithms for Cooperative Multisensor Surveillance," Proceedings of the IEEE, vol. 89, No. 10, Oct. 2001, pp. 1456-1477.*

C. Stauffer, W.E.L. Grimson, Learning Patterns of Activity Using Real-Time Tracking.

R. Collins, A. Lipton, H. Fujiyoshi and T. Kanade, "Algorithms for Cooperative Multisensor Surveillance."

Lockwood, Herbert, "Point-of-Sale Videos Provide a New Medium," San Diego Daily Transcript (A) Mar. 11, 1992, Business Dateline, ProQuest. Web. Dec. 5, 2010.

International Search Report issued in PCT Application No. PCT/US07/12616, mailed on Dec. 7, 2007.

Written Opinion issued in PCT Application No. PCT/US07/12616, mailed on Dec. 7, 2007.

\* cited by examiner

Alert Report 1310

From: 09/27/2005 07:36 PM  
To: 09/28/2005 07:36 PM  1312
Sensor(s): All
Advanced Filter(s): Empolyee #:Smith-0011  1320

1300

Total Number and Cash Value of Events 1352

1356                                                           1354

| Statistics | Fraudulent | Non-Fraudulent | Do Not Care |
|---|---|---|---|
| # Invalid Return | 15 | 18 | 17 |
| # Invalid Override | 9 | 21 | 9 |
| # Total | 24 | 39 | 26 |
| $ Invalid Return | $ 786.14 | $ 963.02 | $ 657.23 |
| $ Invalid Override | $ 537.77 | $ 1,007.24 | $ 339.59 |
| $ Total | $ 1,323.91 | $ 1,970.26 | $ 996.82 |

Employee(s) Involved

| Employee Number | Fraudulent | Non-Fraudulent | Do Not Care |
|---|---|---|---|
| Smith-0011 | 24 | 39 | 26 |

Register(s) Involved

| Register Number | Fraudulent | Non-Fraudulent | Do Not Care |
|---|---|---|---|
| 004505 |  | 1 |  |
| 046400 |  |  | 1 |
| 052982 |  |  | 1 |
| 059460 |  | 1 |  |
| 061007 |  | 1 |  |
| 075789 |  | 1 |  |
| 104983 |  |  | 1 |
| 108541 | 1 |  |  |

Store(s) Involved

| Store Location | Fraudulent | Non-Fraudulent | Do Not Care |
|---|---|---|---|
| Cherry Hill, NJ | 24 | 39 | 26 |

Alert Entries

| Alert Id | Date/Time | Event | Ground Truth | Item | Price | Receipt No. | Employee # | Register # | Store Location |
|---|---|---|---|---|---|---|---|---|---|
| fa1f355f-a6d9-4f35-a2f7-a8a2a625ecc8 | 2005-09-28 22:04:25 | Invalid Return | fraudulent | Item 058 | $ 96.31 | 2-7538 | Smith-0011 | 483915 | Cherry Hill, NJ |
| b4d4d5ed-ed2d-4668-acac-7af75541b909 | 2005-09-28 22:05:13 | Invalid Return | non-fraudulent | Item 713 | $ 26.20 | 4-5255 | Smith-0011 | 333493 | Cherry Hill, NJ |
| af3d49ec-4dt5-4fe8-b115-62907d98972a | 2005-09-28 22:07:37 | Invalid Return | non-fraudulent | Item 999 | $ 28.83 | 1-8217 | Smith-0011 | 210387 | Cherry Hill, NJ |
| 579ff62e-c971-4068-98ca-f2dcd771f648 | 2005-09-28 22:09:32 | Invalid Override | fraudulent | Item 518 | $ 60.88 | 4-0095 | Smith-0011 | 208840 | Cherry Hill, NJ |
| 21c1c8f5-1026-4606-9b55-dfd1f750bd23 | 2005-09-28 22:10:20 | Invalid Override | non-fraudulent | Item 984 | $ 60.41 | 1-5873 | Smith-0011 | 075789 | Cherry Hill, NJ |

INTELLIGENT VIDEO VERIFICATION OF POINT OF SALE (POS) TRANSACTIONS

CROSS-REFERENCE TO RELATED PATENTS AND PUBLICATIONS

This application is a divisional of co-pending U.S. patent application Ser. No. 11/802,895, filed May 25, 2007, which is incorporated herein by reference in its entirety. U.S. patent application Ser. No. 11/802,895 claims priority from U.S. Provisional Application No. 60/803,191 filed May 25, 2006.

Additionally, the following patents and publications, the subject matter of each is being incorporated herein by reference in its entirety, are mentioned:

U.S. Published Patent Application No. 2007/0058040, published Mar. 15, 2007, by Zhang et al., entitled "Video Surveillance Using Spatial-Temporal Motion Analysis,"

U.S. Published Patent Application No. 2006/0291695, published Dec. 28, 2006, by Lipton et al., entitled "Target detection and tracking from overhead video streams," which issued on Sep. 14, 2010 as U.S. Pat. No. 7,796,780, U.S. Published Patent Application No. 2006/0262958, published Nov. 23, 2006, by Yin et al., entitled "Periodic motion detection with applications to multi-grabbing," which issued on Nov. 3, 2009 as U.S. Pat. No. 7,613,322, U.S. Published Patent Application No. 2005/0169367, published Aug. 4, 2005, by Venetianer et al., entitled "Video Surveillance System Employing Video Primitives," which issued on Jan. 11, 2011 as U.S. Pat. No. 7,868,912, U.S. Published Patent Application No. 2005/0162515, published Jul. 28, 2005, by Venetianer et al., entitled "Video Surveillance System,"

U.S. Published Patent Application No. 2005/0146605, published Jul. 7, 2005, by Lipton et al., entitled "Video Surveillance System Employing Video Primitives," and U.S. patent application Ser. No. 11/700,007, filed Jan. 31, 2007, by Zhang et al., entitled "Target Detection and Tracking From Video Streams,", which issued on Sep. 21, 2010 as U.S. Pat. No. 7,801,330.

BACKGROUND

The following relates to video surveillance and verification systems. It finds specific application in conjunction with the video surveillance and verification of point of sale transactions (POS) in the retail environments and would be described with a particular reference thereto. However, it is to be appreciated that the following is also applicable to the video surveillance and verification of point of sale transactions and other transactions in health care facilities, restaurants, and the like.

Employee theft is one of the largest components of retail inventory shrink. Employee theft leads to losses of approximately $17.8 billion annually. For many of the retail stores operating today in the United States, such loss might mean the difference between being profitable and failure. Therefore, many retailers are trying to eliminate the inventory shrink to increase overall company profitability.

Most current technologies are either easily bypassed by a knowledgeable employee or require too much personnel time to review potential fraud. For example, passive electronic devices attached to the theft-prone items in retail stores to trigger an alarm might be deactivated by an employee before the item leaves the store. Moreover, the passive electronic devices are ineffective in detecting internal theft such as cash fraudulent activities.

One solution is to monitor and scrutinize every sales transaction. However, it is nearly impossible in large retail chains and puts a heavy load on managers, accountants, and loss prevention professionals.

Another solution is to provide employee training programs geared toward loss prevention to help employees to better understand transaction rules. For example, anonymous tip lines might help employees to report dishonest co-workers. However, this solution does not entirely eliminate retail theft. The loss might still occur and might be difficult to recover.

Another solution is to use an exception-based reporting software. Such software mines POS data from the cash registers for inconsistencies in associate transactions. A designated professional may run reports and queries from the mined data to detect potential fraudulent activity at the stores. Because evidence must be collected and reviewed to determine a fraudulent pattern, theft detection or intervention might take days or even weeks. In the meantime, a high number of the activities under investigation might be determined to be legitimate, making this method costly and time consuming. In addition, as exception-based reporting tools work with the data provided by the POS terminal, the POS data might be manipulated by an unauthorized person and, thus, might become inaccurate.

Another solution is to monitor the POS terminal with a video surveillance system to capture the activity around the POS terminal. This allows employers to keep a permanent visual record of the activities which might be used as evidence against stealing employees. One drawback of the video surveillance systems is the production of enormous volumes of data. It might be difficult to monitor the POS terminals in real-time to detect fraudulent activities. In addition, it might be impractical to transmit, store, and manage video data of multiple transactions at multiple stores.

SUMMARY

An exemplary embodiment of the invention includes a computer-readable medium comprising software for monitoring a point of sale (POS) transaction, which software, when executed by a computer system, causes the computer system to perform operations comprising: a method of receiving non video data regarding the point of sale (POS) transaction, generating POS primitives based on the received non video POS data, receiving video data regarding a corresponding POS transaction, generating video primitives based on the received video data, and inferring an exceptional transaction based on a corresponding exceptional transaction rule and at least one of the generated POS primitives or video primitives.

An exemplary embodiment of the invention includes a computer-readable medium comprising software for monitoring a point of sale (POS) transaction, which software, when executed by a computer system, causes the computer system to perform operations comprising: a method of receiving non video data regarding the point of sale (POS) transaction, inferring a potentially exceptional transaction based on a corresponding exceptional transaction rule and the received POS non video data, and verifying the inferred potentially exceptional transaction based on video data regarding a corresponding POS transaction.

An exemplary embodiment of the invention includes a method for monitoring a point of sale (POS) transaction, comprising: receiving non video data regarding the point of sale (POS) transaction, generating POS primitives based on the received non video POS data, receiving video data regarding a corresponding POS transaction, generating video primitives based on the received video data, and inferring an exceptional transaction based on a corresponding exceptional transaction rule and at least one of the generated POS primitives or video primitives.

An exemplary embodiment of the invention includes a method for monitoring a point of sale (POS) transaction, comprising: receiving non video data regarding the point of sale (POS) transaction, inferring a potentially exceptional transaction based on a corresponding exceptional transaction rule and the received POS non video data, and verifying the inferred potentially exceptional transaction based on video data regarding a corresponding POS transaction.

An exemplary embodiment of the invention includes a system, comprising: a POS data parsing engine to receive non video data regarding a POS transaction and generate POS primitives, a video content analysis engine to receive video data regarding a corresponding POS transaction and generate video primitives, and an exceptional transaction inference engine to infer an exceptional transaction based on a corresponding exceptional transaction rule and at least on one of the generated POS primitives or video primitives.

An exemplary embodiment of the invention includes a system, comprising: a POS data parsing engine to receive and process non video data regarding a POS transaction, and an exceptional transaction inference engine to infer a potentially exceptional transaction based on a corresponding exceptional transaction rule and the processed non video POS data and verify the inferred potentially exceptional transaction based on video data.

An exemplary embodiment of the invention includes an apparatus, comprising: means for receiving non video point of sale (POS) data of a POS transaction, means for processing the non video POS data, means for receiving video data of a corresponding POS transaction, means for processing the received video data, and means for inferring an exceptional transaction based on a corresponding exceptional transaction rule and at least on the processed non video POS data or the processed video data.

BRIEF DESCRIPTION OF THE DRAWINGS

The foregoing and other features and advantages of the invention will be apparent from the following, more particular description of the embodiments of the invention, as illustrated in the accompanying drawings.

FIG. 13 shows exemplary reports generated according to an exemplary embodiment of the invention; and FIG. 14 shows exemplary reports generated to an exemplary embodiment of the invention.

DEFINITIONS

Figure 1:
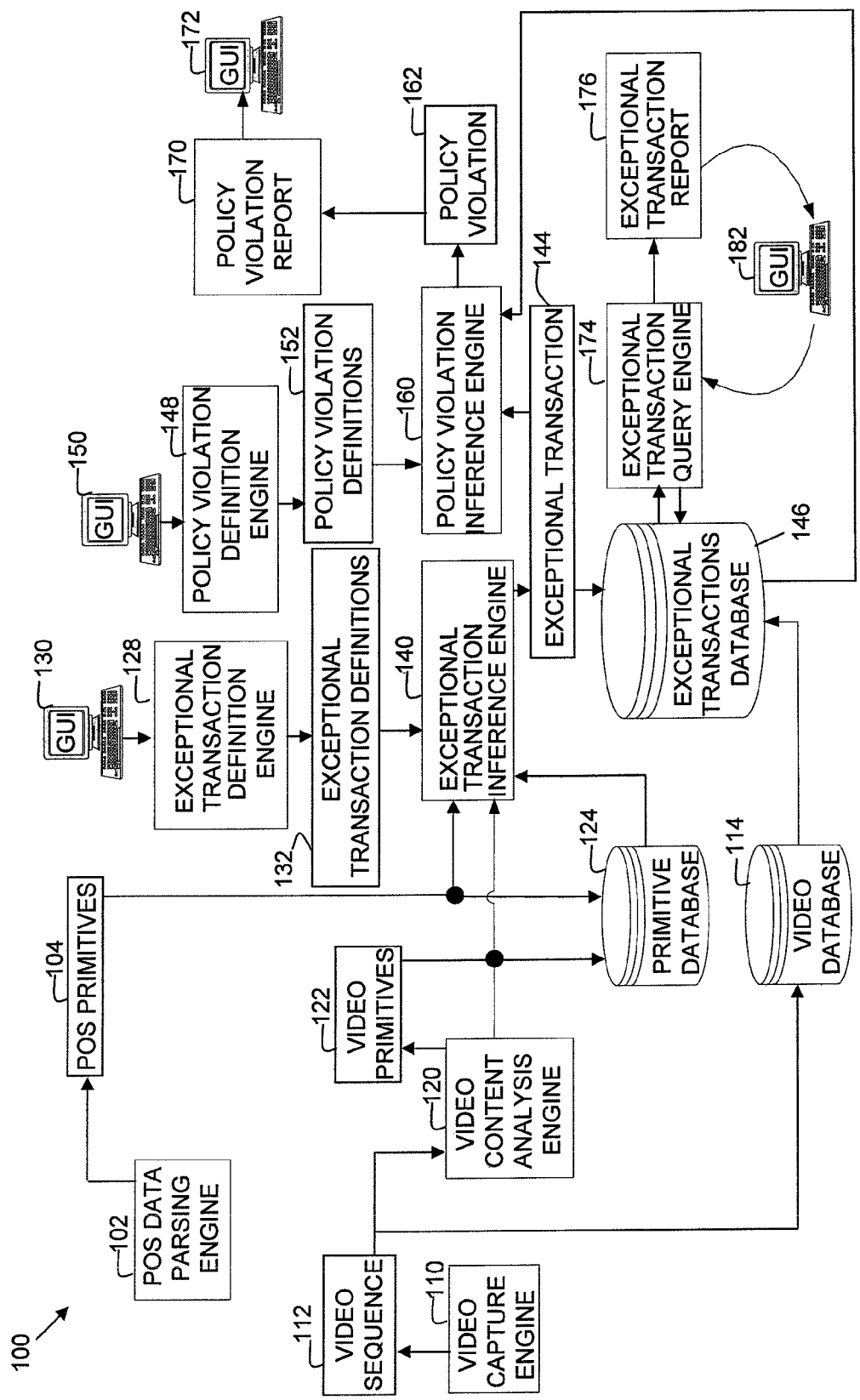
FIG. 1 is a diagrammatic illustration of an exemplary video surveillance system according to an exemplary embodiment of the invention.

In describing the invention, the following definitions are applicable throughout (including above).

"Video" may refer to motion pictures represented in analog and/or digital form. Examples of video may include: television; a movie; an image sequence from a video camera or other observer; an image sequence from a live feed; a computer-generated image sequence; an image sequence from a computer graphics engine; an image sequences from a storage device, such as a computer-readable medium, a digital video disk (DVD), or a high-definition disk (HDD); an image sequence from an IEEE 1394-based interface; an image sequence from a video digitizer; or an image sequence from a network.

A "video sequence" may refer to some or all of a video.

A "video camera" may refer to an apparatus for visual recording. Examples of a video camera may include one or more of the following: a video imager and lens apparatus; a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan, tilt, zoom (PTZ) camera; and a video sensing device. A video camera may be positioned to perform surveillance of an area of interest.

"Video processing" may refer to any manipulation and/or analysis of video, including, for example, compression, editing, surveillance, and/or verification.

A "frame" may refer to a particular image or other discrete unit within a video.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a microcomputer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; interpreted code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that may store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

DETAILED DESCRIPTION OF EXEMPLARY EMBODIMENTS

In describing the exemplary embodiments of the present invention illustrated in the drawings, specific terminology is employed for the sake of clarity. However, the invention is not intended to be limited to the specific terminology so selected. It is to be understood that each specific element includes all technical equivalents that operate in a similar manner to accomplish a similar purpose. Each reference cited herein is incorporated by reference.

With reference to FIG. 1, a point of sale (POS) transaction verification system 100 performs a POS transaction verification and analysis process. A POS data parsing engine 102 may receive, parse and convert non video POS data into POS primitives 104. The POS data may be received, for example, from a POS terminal (not shown). The POS primitives 104 may be data descriptions of the content of the POS data. The POS primitives 104 may be related to video primitives as described in U.S. Published Patent Application No. 2005/0146605, identified above. A video capture engine 110 may capture a video data or sequence 112 of a POS transaction, for example, from a video camera (not shown). The video data 112 may be optionally stored in a video database 114. The video database 114 may include video files, or video stored on a digital video recorder (DVR), network video recorder (NVR), personal computer (PC), video tape, or other appropriate storage device.

A video content analysis engine 120 may analyze the video sequence 112 by using known data processing content analysis algorithms to generate video primitives 122, as described, for example, in U.S. Published Patent Application No. 2005/0146605, identified above. For example, the video primitives 122 may include information relating to the number of people present in each area in each frame; where the people's hands are positioned, e.g., in what direction the hands are reaching; how many objects are being bagged, and the like.

Optionally, the video primitives 122 and POS primitives 104 may be stored in a primitive database 124 for off-line analysis, as described, for example, in U.S. Published Patent Application No. 2005/0146605, identified above.

An exceptional transaction definition engine 128 may define what constitutes an exceptional transaction. In one embodiment, an exceptional transaction may be defined by combining a predetermined video data event and a predetermined POS data event. In another embodiment, an exceptional transaction may be defined based on one of the predetermined video data event or predetermined POS data event. For example, an operator may interact with the POS transaction verification and analysis system 100, via a first graphical user interface (GUI) 130 to define exceptional transaction definitions or rules 132. An exemplary exceptional transaction may be a "a cash refund or void transaction with no customer present", which may be defined by combining a "cash refund or void transaction" POS data event with a "no person detected in the customer area" video data event. Another exemplary exceptional transaction may be: "a manager override without a manager present", which may be defined by combining a "POS transaction requiring manager override" POS data event, e.g. a large refund or void transaction, with an "only one person visible in the employee area" video data event. Another exemplary exceptional transaction may be: "stealing a controlled item", which may be defined by combining a "detecting the grabbing of a controlled item", e.g. a pack of cigarettes, video data event with a "POS transaction does not include the controlled item immediately afterward" POS data event. Another exemplary exceptional transaction may be: "returning a stolen item", which may be defined by combining a "refund POS transaction" POS data event with the "customer coming to the POS register from within the store, not from the entrance" video data event. Another exemplary exceptional transaction may be: "a sweethearting", e.g. an employee deliberately not ringing up some items, which may be defined by combining an "x items scanned" POS data event with the "x+y items placed in bags or handed to the customer" video data event. Another exemplary exceptional transaction may be: "cash drawer is open without a legitimate transaction occurring", which may be defined by combining a "cash drawer is open" video data event and a "no POS transaction" POS data event. Of course, it is contemplated that other exceptional transaction definitions 132 may be defined by the exceptional transaction definition engine 128.

An exceptional transaction inference engine 140 may process the video primitives 122 and POS primitives 104 and determine if an exceptional transaction 144 has occurred based on a corresponding exceptional transaction rule 132. The exceptional transaction inference engine 140 may be implemented as described in U.S. Published Patent Application No. 2005/0162515, identified above. The determined exceptional transactions 144 may be stored in an exceptional transactions database 146 for further study or analyzed in real-time for policy violations as described below. The exceptional transactions may be detected real-time, or offline, based on data stored in the primitive database.

The exceptional transactions 144 may include, for example, the following data:
  Date and time of each transaction
  POS data
  Video associated with each transaction
  Store name
  Store ID/Location
  Region
  POS terminal ID
  Employee ID(s)
  Cash Value
  Tender type (credit, debit, cash, check, gift card, other)
  Transaction type (sale, refund, void, discount, other)
  Reason for determining a transaction as an exceptional transaction (which rule is broken)
  Ground Truth (fraudulent, non-fraudulent)
  Ground Truth history (who labeled—"system" by default)

A policy violation definition engine 148 may determine what constitutes a violation with respect to the exceptional transaction. For example, an operator may interact with the POS transaction verification and analysis system 100 via a second GUI 150 to define store policy violation definitions 152 with respect to the exceptional transactions. Policy violation definitions 152 may describe combinations of exceptional transaction data that constitute breach of policy and therefore may require further investigation or disciplinary action. Examples of policy violation definitions may include: "any exceptional transaction;" "the same employee performs x exceptional transactions in y period of time;" "exceptional transactions are detected at the same POS terminal x times within a day;" "exceptional transactions occur at a particular time of a day;" or the like. A policy violation inference engine 160 may process each exceptional transaction 144 and determine, based on a corresponding policy violation definition or rule 152, whether the exceptional transaction 144 constitutes a policy violation 162. The policy violation inference engine 160 may process the exceptional transactions 144 in real time, or analyze, the exceptional transactions 144 after the event occurrence based on the data stored in the exceptional transactions database 146. The policy violation inference engine 160 may be implemented as described, for example, in U.S. Published Patent Application No. 2005/0162515, identified above.

The policy violation inference engine 160 may generate policy violation report or reports 170 that may be viewed by a user at a third GUI 172, printed, exported or otherwise managed as a document.

The exceptional transactions database 146 may be queried by an exceptional transaction query engine 174 to generate a report or reports 176 of exceptional POS activity or activities as described in greater detail below. For example, a user may create a query by using a fourth GUI 182. As a result, the exceptional transactions database 146 may be searched. Records that match the query may be retrieved and processed to generate the exceptional transaction report 176. Examples of transaction queries may include: "show all exceptional transactions;" "show all exceptional transactions from store x;" "show the exceptional cash refund transactions over $50 in value;" "show the exceptional transactions involving employee ID x;" "show the exceptional transactions over $50 involving employee x;" or the like.

In one embodiment, the fourth GUI 182 may be used for manual handling or sorting of the exceptional transactions. For example, the POS transaction verification and analysis system 100 may detect an exceptional transaction that is not in fact exceptional. For example, the POS transaction verification and analysis system 100 may produce a false alarm when the transaction does not meet the criteria for being exceptional. As another example, the transaction may meet the criteria as being exceptional, but there may be a legitimate reason for the transaction to exist, such as training. Thus, the transaction can not be considered suspicious. Consequently, the POS transaction verification and analysis system 100 may allow a user to define or label such transactions as, for example: "false alarm," "legitimate exception," "do not care," or with other appropriate label.

Of course, it is contemplated that the user interfaces 130, 150, 172, 182 may be collocated, distributed, part of the same interface, or different interfaces.

Figure 2:
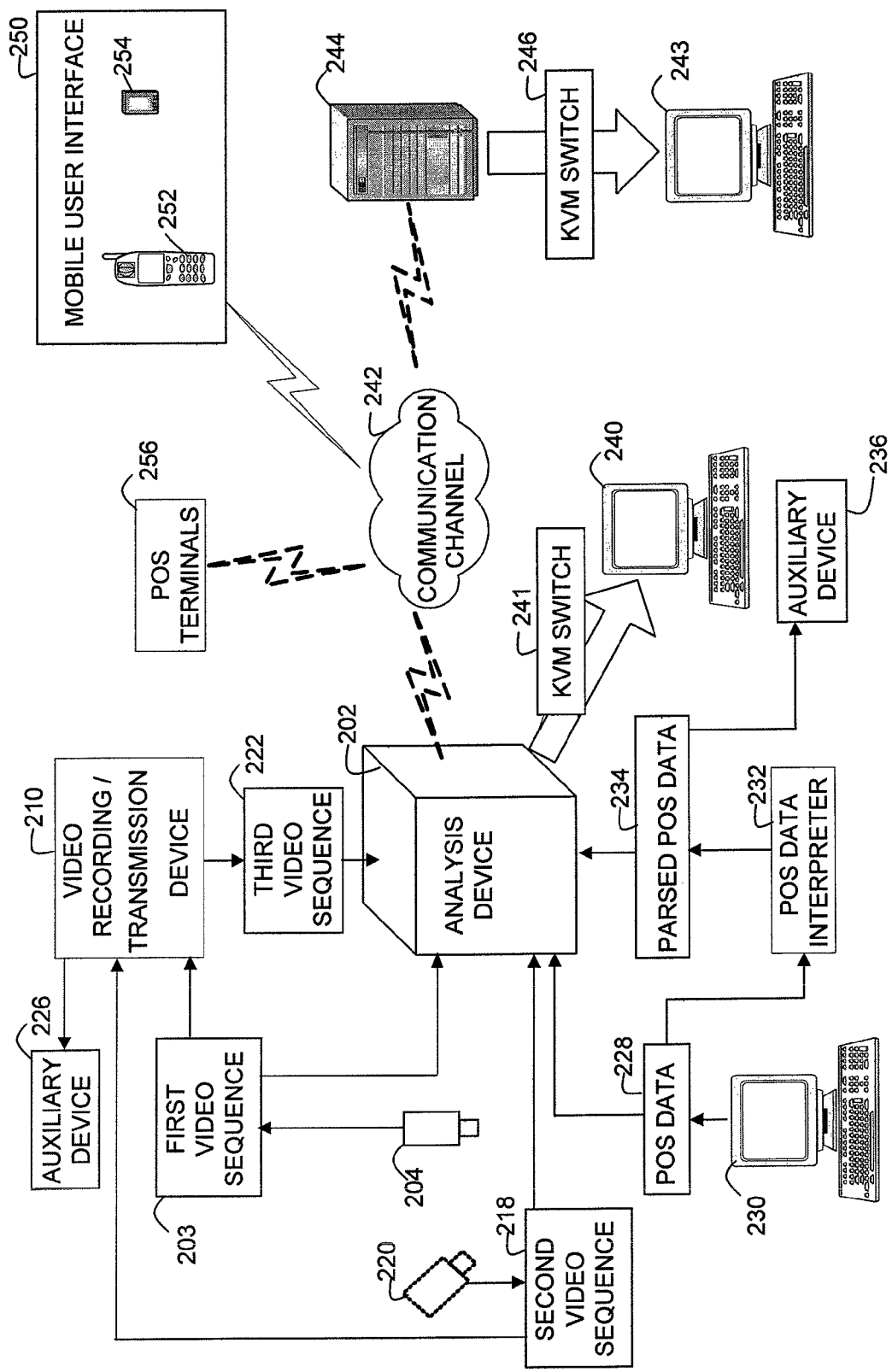
FIG. 2 is the diagrammatic illustration of an exemplary local processing system according to an exemplary embodiment of the invention.

With reference to FIG. 2, the exceptional transaction detection and analysis as described above with reference to FIG. 1 may be performed in an exemplary local processing system 200 which may include an analysis device or appliance 202, which may be a stand-alone device, a personal computer (PC), a digital video recorder (DVR), a network video recorder (NVR), a video encoder, a traditional exception-based reporting system, a router, or any other appropriate device type. The analysis device 202 may include all or any combinations of components of the POS transaction verification and analysis system 100.

The analysis device 202 may receive a first video sequence 203 from a first, primary, or analysis video camera 204 which may observe a POS terminal area (not shown). The first video sequence 203 may include direct analog or digital video, wireless interne protocol (IP) video, networked IP video, or any other video transmission mechanism. In one embodiment, the first video sequence 203 may be received via a video recording/transmission system or device 210 such as a DVR, NVR, router, encoder, or other appropriate device which may store, transmit, or use the first video sequence 203 for a purpose other than the video analysis of the POS transactions. In addition, the analysis device 202 may optionally receive a second video sequence 218 from a second, secondary, or spotter video camera 220. The second video camera 220 may be positioned in a different viewing location than the first video camera 204 and may provide auxiliary video information. For example, if the first video camera 204 is ceiling mounted, the second video camera 220 may be mounted to provide good face snapshots. The second video camera 220 may be used only as auxiliary data for human viewing. The second video camera 220 may also be used for additional video analytics, e.g., for face recognition. In one embodiment, the second video sequence 218 may be received via an optional video device, such as the video device 210. For example, the video device 210 may transmit a third video sequence 222 to the analysis device 202. In one embodiment, the third video sequence 222 may be a combination of the first and second video sequences 203, 218. The video device 210 may transmit at least one of the first video sequence 203, second video sequence 218, or a combination of the first and second video sequences to an auxiliary device, devices or applications 226.

The analysis device 202 may receive POS data 228 from a POS terminal 230, such as a cash register, via a serial communications port, a network interface, or any other appropriate communication mechanism. Alternatively, the analysis device 202 may receive the POS data 228 via a POS data interpreter 232. The POS data interpreter 232 may include a serial interface, a POS parser, a DVR, a POS data management application or device, or any other appropriate POS interface device. For example, the POS data interpreter 232 may send parsed POS data 234 to the analysis device 202. Optionally, the POS data interpreter 232 may send the parsed PUS data 234 to an auxiliary device 236 such as an application, or communication channel for some other purpose.

Interacting with the analysis device 202 may be done in a number of different ways. The analysis device 202 may be configured and operated locally via a local user interface terminal 240 via, for example, a first keyboard, video, mouse (KVM) switch 241. Optionally, the analysis device 202 may be configured and operated remotely via a communication channel 242. The communication channel 242 may include a network, a wireless network, a local area network (LAN), a wide area network (WAN), a serial network, a universal serial bus (USB) network, a dial-up connection, a digital subscriber line (DSL) connection, or any other appropriate communication network configuration. The analysis device 202 may be configured and operated from a remote user interface 243 via a web interface or remote connection 244 and a second KVM switch 246. The analysis device 202 may be configured and operated via a mobile device 250, such as a cell phone 252, PDA 254, or the like. It is contemplated that multiple analysis devices receiving POS data and video data concerning multiple POS terminals 256 in multiple stores may be configured and operated from the same central location.

Figure 3:
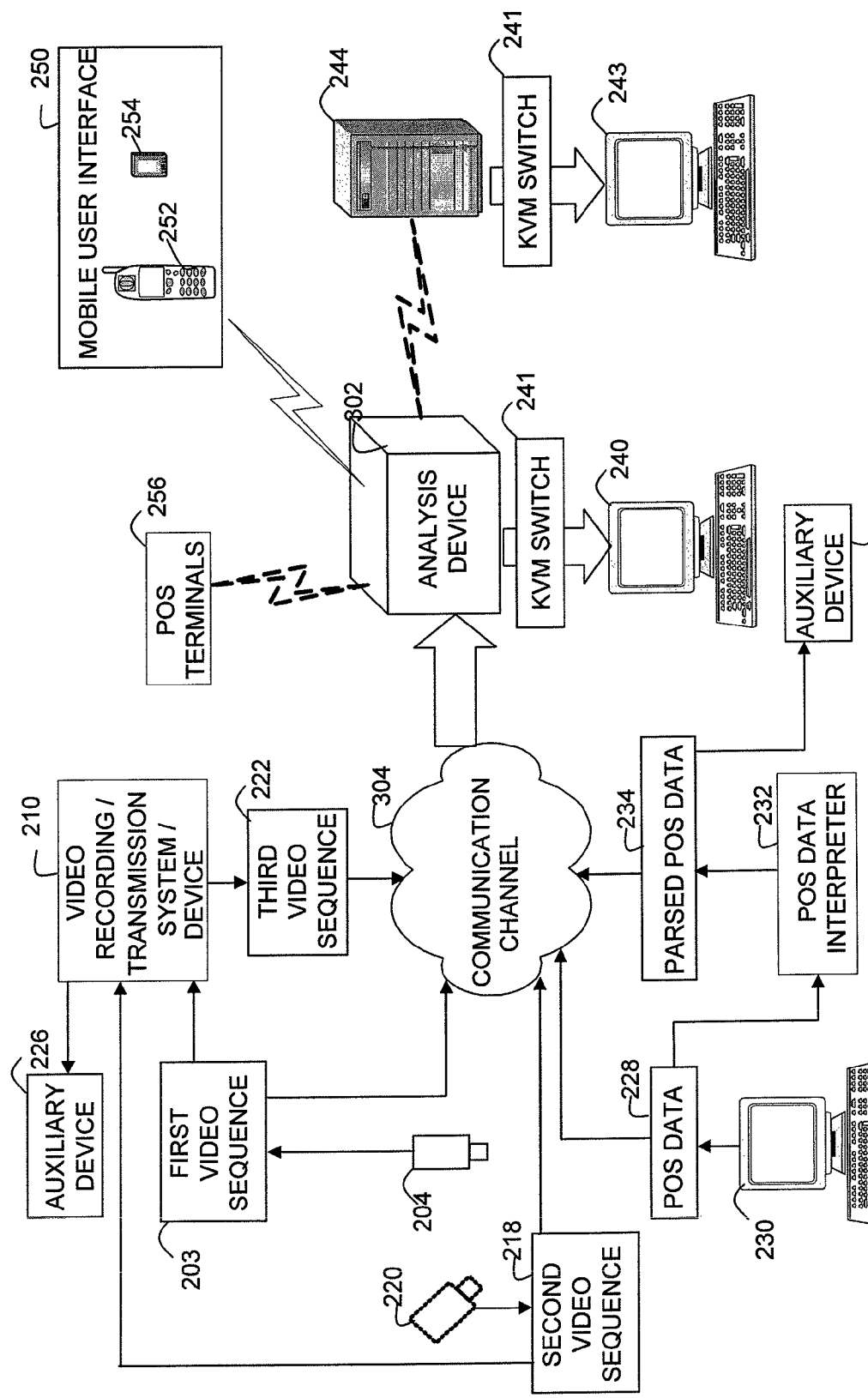
FIG. 3 is a diagrammatic illustration of an exemplary remote processing system according to an exemplary embodiment of the invention.

With reference to FIG. 3, the exceptional transaction detection and analysis as described above with reference to FIG. 1 may be performed in an exemplary remote processing system 300. The first video sequence 203 from the first video camera 204 and, optionally, the second video sequence 218 from the second video camera 220 may be sent to an analysis device or appliance 302 via a communication channel 304. Optionally, the first and the second video sequences 203, 218 may be sent to the video device 210 as described above. The video device 210 may transmit the third video sequence 222 to the analysis device 302 via the communication channel 304. The first, second and/or third video sequence 203, 218, 222 may include wireless video, Internet protocol (IP) video, analog video, or any other appropriate video format.

The POS data 228 may be transmitted to the analysis device 302 via the communication channel 304. Optionally, the POS data 228 may be transmitted via the POS data interpreter 232 to the communication channel 304 and, consequently, to the analysis device 302. Alternatively, some of the video sequences 203, 218, 222 or POS data 228 may be received by the analysis device 302 omitting the communication channel 304. For example, one data source may transmit the data via the communication channel 304, while the other data source may transmit the data directly to the analysis device 302.

The analysis device 302 may include all or any combinations of the components of the POS transaction verification and analysis system 100 and perform the exceptional transaction detection and analysis as described above regarding FIG. 1. The analysis device 302 may be configured and operated locally by the local user interface terminal 240 or through the network connection by the remote terminal 243 using the web interface or remote desktop connection 244. Alternatively, the analysis device 302 may be configured and operated by the mobile device 250, such as the cell phone 252, PDA 254, or the like. It is contemplated that the analysis device 302 may process the POS data and the video data from multiple POS terminals 256 at multiple locations.

Figure 4:
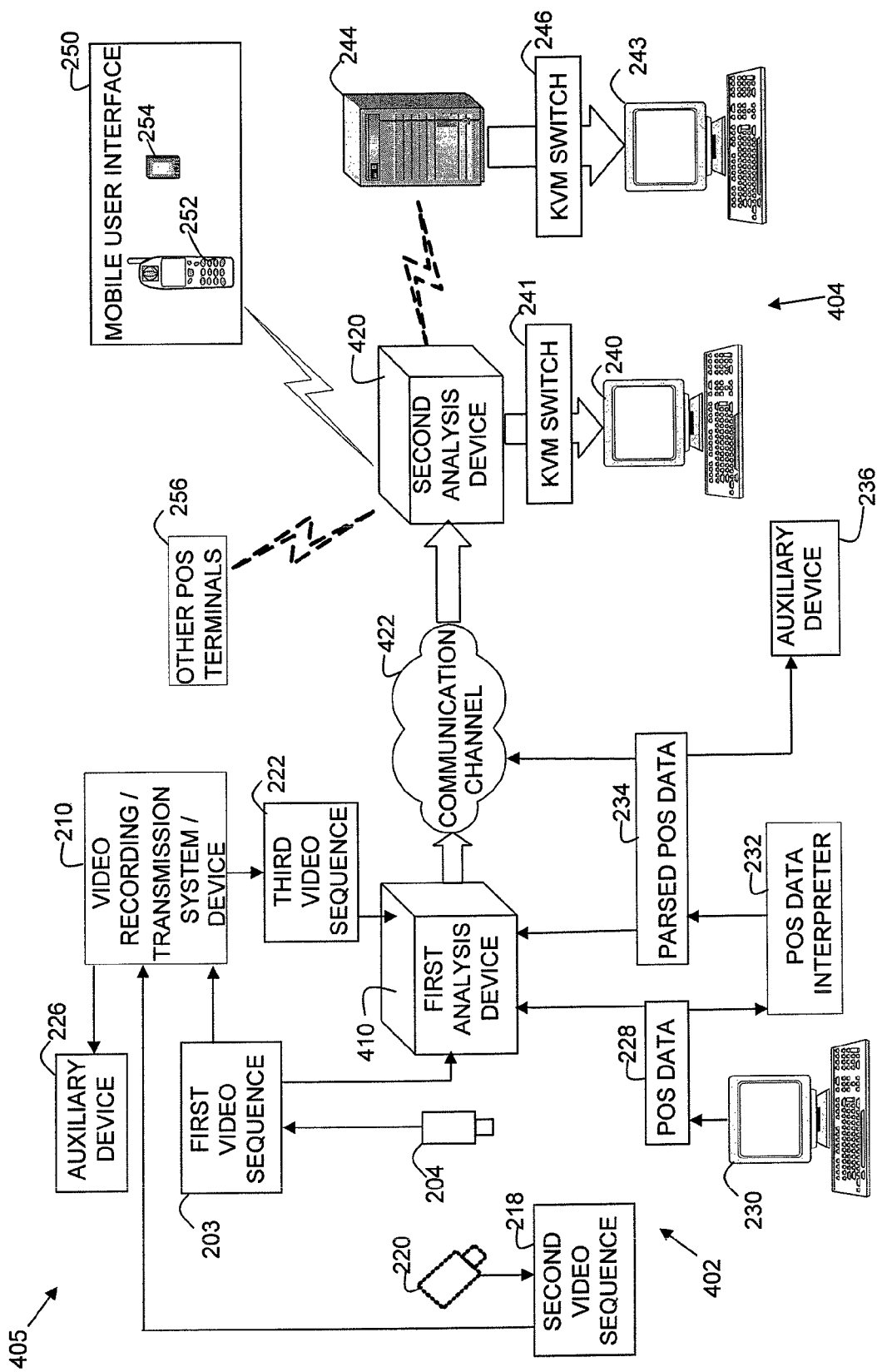
FIG. 4 is a diagrammatic illustration of an exemplary distributed processing system according to an exemplary embodiment of the invention.

With reference again to FIG. 1 and further reference to FIG. 4, the POS verification and analysis process described above with reference to FIG. 1 may be split between local processing 402 and remote processing 404 in an exemplary distributed processing system 405. For example, in the local processing 402, a first analysis device 410 may generate the video primitives 122 and optionally the POS primitives 104. The video primitives 122 and the POS data 228 or POS primitives 104 may be streamed to a second analysis device 420 via a communication channel 422. The rest of the processing may be performed by the second analysis device 420 as a remote processing. E.g., configuration of definitions of exceptional transactions 132 and policy violations 152, detection of exceptional transactions and policy violations, generation of reports, and the like. In this embodiment, the bandwidth between the local and the remote locations may be controlled. E.g., the high bandwidth video may be processed locally, while only low bandwidth video primitives and POS data may be sent to the central location, allowing inferencing over multiple locations. In addition, multiple back-end applications may be supported. Examples of such an architecture are described in U.S. Published Patent Application No. 2005/0169367, identified above. This embodiment is particularly well suited for integration with legacy systems. Some stores, which use exception based reporting (XBR) systems installed remotely, download the POS data in batches, e.g., once a day. Transmitting the full video to the remote location requires very high bandwidth, hence it is advantageous to process the video data locally and transmit only the substantially smaller extracted information, such as the video primitives or the results of the video based inferencing.

Figure 5:
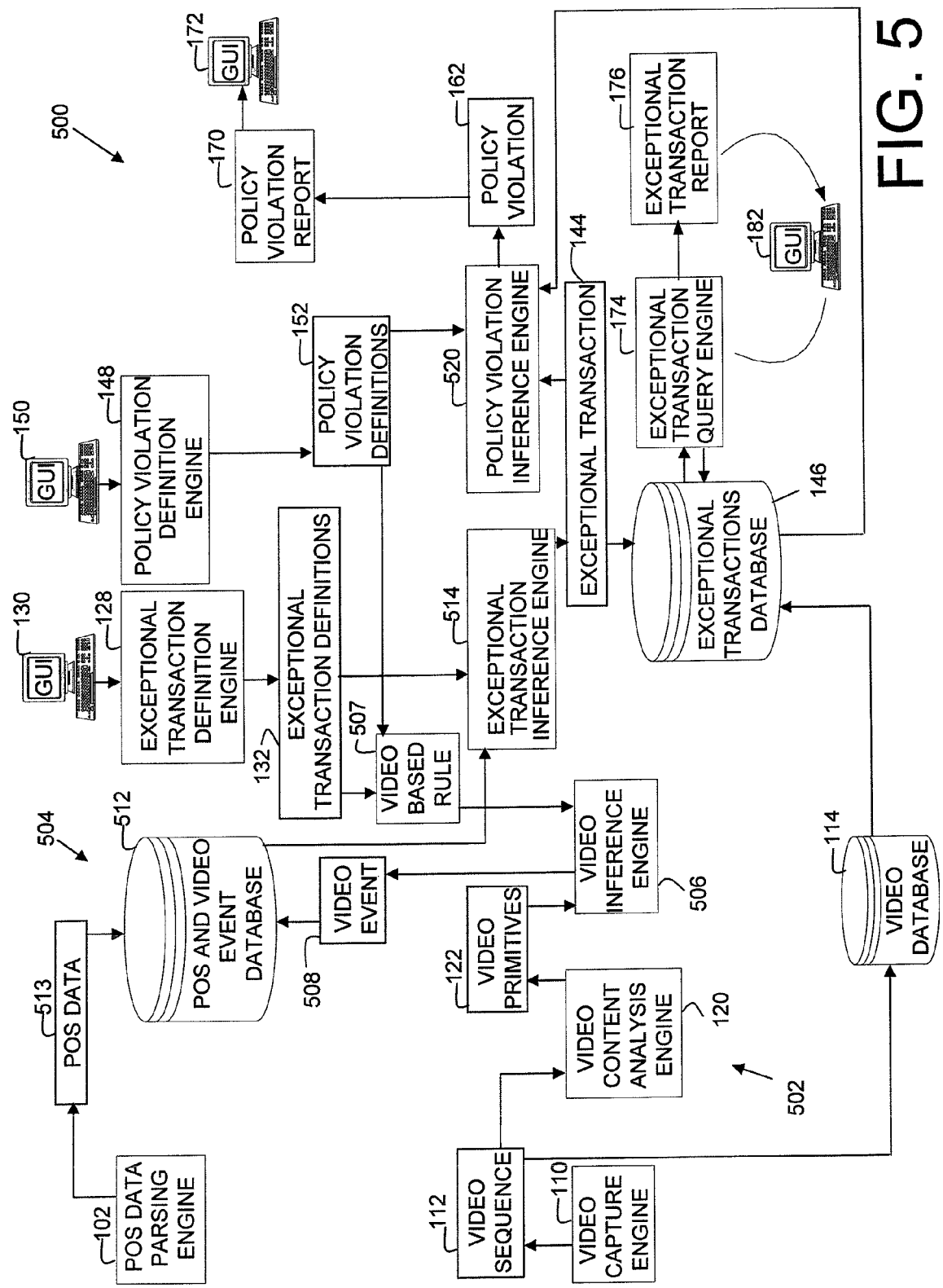
FIG. 5 is a diagrammatic illustration of an exemplary video surveillance system according to an exemplary embodiment of the invention.

With reference to FIG. 5, in a POS transaction verification and analysis system 500, a video analysis system 502 and a POS analysis system 504 may handle video and POS analysis independently from one another. For example, the POS data may be processed first to infer a candidate exceptional transaction, e.g., a potentially exceptional transaction. If a transaction requires corresponding video verification, then the corresponding video data may be processed on demand or request. E.g., the POS analysis system 504 may control the video analysis system 502 to process the corresponding video offline. Because video processing is resource intensive and only relatively few transactions require video verification, a single video analysis system may cover several POS terminals. The video content analysis engine 120 may analyze the video sequence 112. The video primitives 122 may be sent to a video inference engine 506. The video inference engine 506 may receive a video based rule or rules 507 as an input. An example of the video based rule 507 may be a specification of an area of interest in which the video inference engine 506 is to count the number of people. The video based rule 507 may be defined by the exceptional transaction definition engine 128 or the policy violation definition engine 148, and may be specified by the user via at least one of the first or second GUI 130,150. The video inference engine 506 may continually evaluate the video data based on the video rule or rules 507. For example, the video inference engine 506 may compute and report the number of people in the area of interest. Video event or events 508 may be stored in a POS and video event database 512, along with POS data 513 received from the POS data parsing engine 102. Exceptional transactions 144 may be inferred or determined by an exceptional transaction inference engine 514 based on the data stored in the POS and video event database 512. Such inference may or may not include the video events 508. A policy violation inference engine 520 may determine the policy violations 162. Similarly to the determination of exceptional transactions, the policy violation determination may or may not include the video events 508. In this embodiment, the video system 502 may be independent from the POS system 504 and specific retail policies by detecting the video events 508, based on the video based rules 507. In one embodiment the video events 508 may be stored as auxiliary fields in the POS and video event database 512, so that searches may be extended to handle the video events 508.

Figure 6:
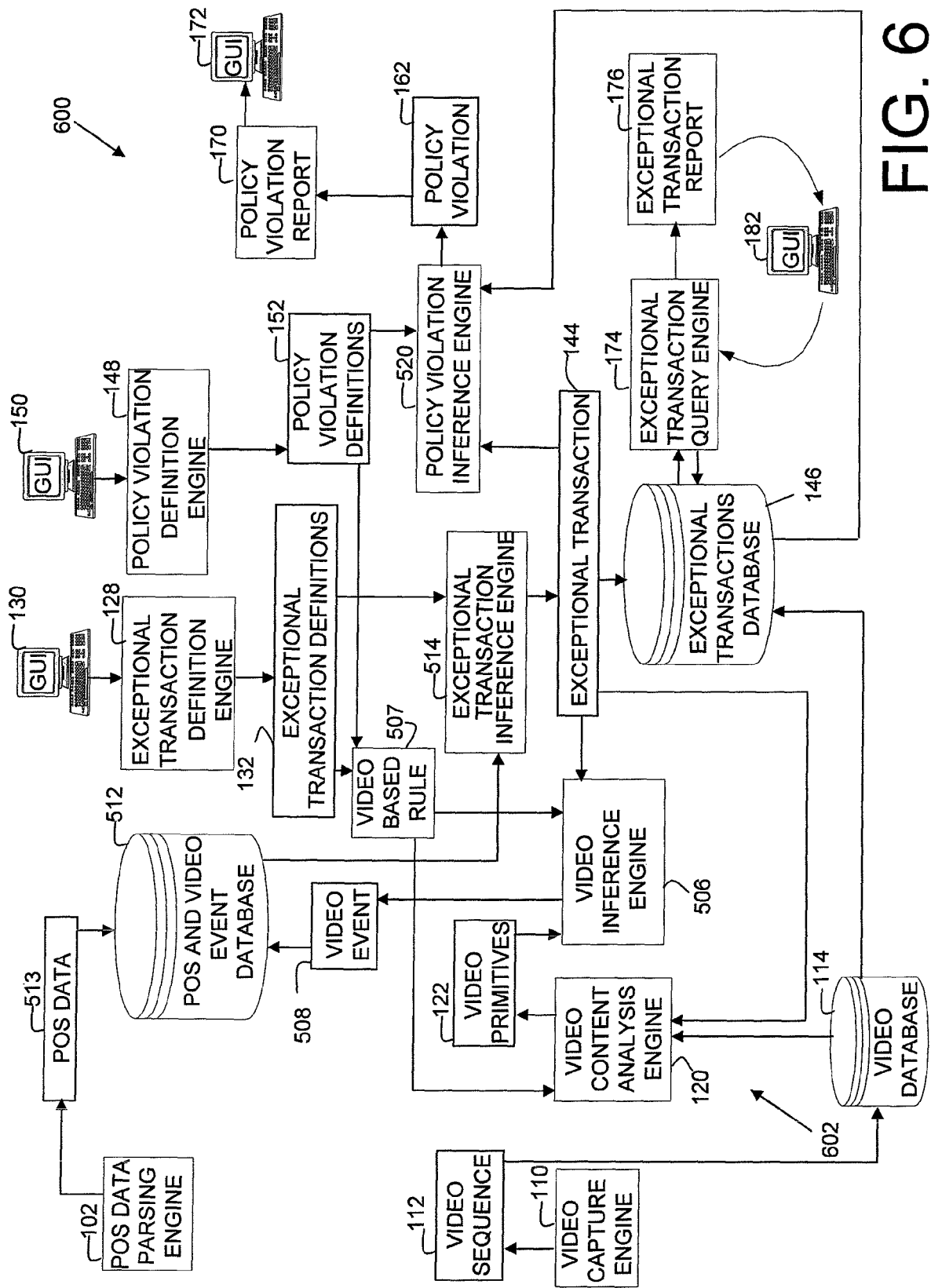
FIG. 6 is a diagrammatic illustration of an exemplary video surveillance system according to an exemplary embodiment of the invention.

With continuing reference to FIG. 5 and further reference to FIG. 6, in a POS transaction verification and analysis system 600, the video content analysis engine 120 may process video, archived in the video database 114, on request. A video analysis system 602 of this embodiment may perform video content analysis and inferencing for a great number of POS terminals. Based on the exceptional transaction definitions 132 and policy violation definitions 152, the exceptional transaction inference engine 514 and policy violation inference engine 520 may determine the suspicious transactions and potential policy violations using only the POS information. To verify whether those are truly exceptional transactions or policy violations, the POS transaction verification and analysis system 600 may request that the video analysis system 602 process the corresponding archived video. The video content analysis engine 120 and video inference engine 506 may analyze the corresponding video by retrieving the video from the video database 114 on request. The resulting video events 508 may be stored along with the corresponding POS data 513 in the POS and video event database 512. The video events may confirm that the suspicious transaction is indeed an exceptional transaction 144 and that the potential policy violation is indeed a policy violation 162. For example, the POS data may indicate a refund transaction. The POS transaction verification and analysis system 600 may submit the corresponding video from the video database 114 to the video content analysis engine 120. The video content analysis engine 120 may generate video primitives 122. The POS transaction verification and analysis system 600 may set up the video based rule 507 asking for the number of people in the customer AOI. The video inference engine 508 may compute the number of people based on the video primitives 122 and the video rule 507, and generate the video event 508, which may be stored in the POS and video event database 512. The video event 508 may provide the final piece of evidence to determine whether the refund transaction was indeed exceptional (with no customer present), or it was a legitimate transaction (with a customer present).

Figure 7:
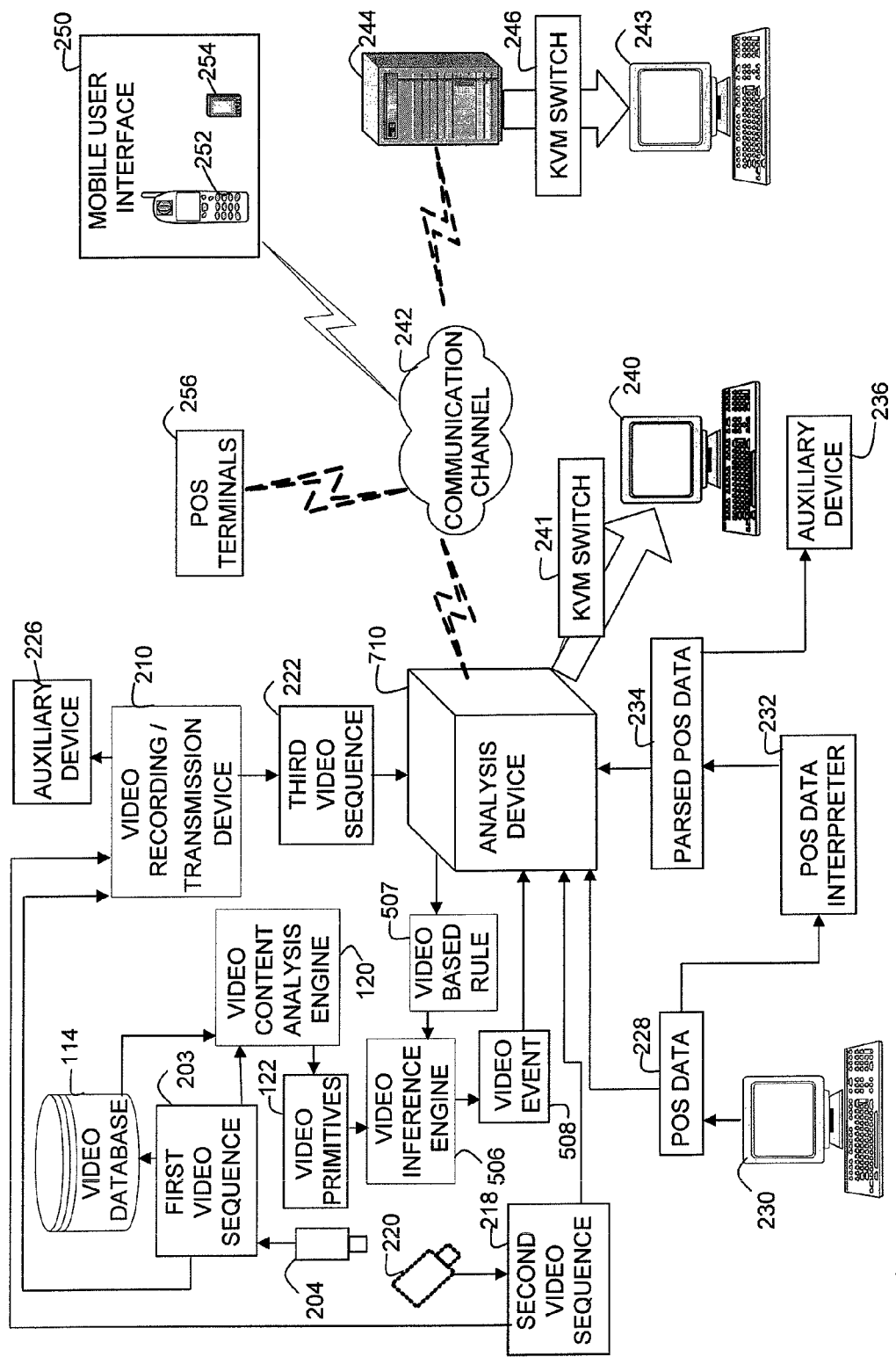
FIG. 7 is a diagrammatic illustration of an exemplary local processing system according to an exemplary embodiment of the invention.

With continuing reference to FIGS. 5 and 6 and further reference to FIG. 7, an exemplary local processing system 700 may perform the POS and the video analysis locally. The processing system 700 may include the video analysis system and the POS analysis system, such as an exception based reporting (XBR) system. The local processing system 700 may include an analysis device or appliance 710, which may be a stand-alone device, a personal computer (PC), a digital video recorder (DVR), a network video recorder (NVR), a video encoder, a traditional exception-based reporting system, a router, or any other appropriate device type. The analysis device 710 may include all or any components of the POS transaction verification and analysis system 500, 600 and perform the exceptional transaction detection and analysis as described above.

The analysis device 710 may receive the POS data 228 from the POS terminal 230 such as a cash register, directly via a serial communications port, a network interface, or any other appropriate communication mechanism. Alternatively, the analysis device 710 may receive the POS data 228 via the POS data interpreter 232. The POS data interpreter 232 may include a serial interface, a POS parser, a DVR, a POS data management application or device, or any other appropriate POS interface device. For example, the POS data interpreter 232 may send parsed POS data 234 to the analysis device 710. Optionally, the POS data interpreter 232 may send the parsed POS data 234 to the auxiliary device 236 such as an application, or communication channel for some other purpose.

On request, the video data of a corresponding POS transaction may be analyzed. The video content analysis engine 120 may receive the first video sequence 203 from the first or analysis video camera 204 which may observe a POS terminal area (not shown). The first video sequence 203 may include direct analog or digital video, wireless internet protocol (IP) video, networked IP video, or any other video transmission mechanism. In the embodiment of FIG. 6, the first video sequence may be sent to the video content analysis engine 120 from the video database 114 on request. The video content analysis engine 120 may analyze the first video sequence 203. The video primitives 122 may be sent to the video inference engine 506. The video inference engine 506 may evaluate the first video sequence 203 based on the video rules 507, and report the video events 508 to the analysis device 710.

The analysis device 710 may optionally receive the second video sequence 218 from the second or spotter video camera 220. Optionally, the second video sequence 218 may be received via an optional video device, such as the video device 210. For example, the video device 210 may transmit the third video sequence 222 to the analysis device 710. In one embodiment, the third video sequence 222 maybe a combination of the first and second video sequences 203, 218. The video device 210 may transmit at least one of the first video sequence 203, second video sequence 218, or a combination of the first and second video sequences 203, 218 to the auxiliary device, devices or applications 226.

Interacting with the analysis device 710 may be done in a number of different ways. The analysis device 710 may be configured and operated directly via the local user interface terminal 240 via, for example, the first keyboard, video, mouse (KVM) switch 241. Optionally, the analysis device 710 may be configured and operated remotely via the communication channel 242. The communication channel 242 may include a network, a wireless network, a local area network (LAN), a wide area network (WAN), a serial network, a universal serial bus (USB) network, a dial-up connection, a digital subscriber line (DSL) connection, or any other appropriate communication network configuration. The analysis device 710 may be configured and operated from the remote user interface 243 via the web interface or remote connection 244 and the second KVM switch 246. The analysis device 710 may be configured and operated via the mobile device 250, such as the cell phone 252, PDA 254, or the like. It is contemplated that multiple analysis devices from multiple POS terminals 256 in multiple stores may all be configured and operated from the same central location.

Figure 8:
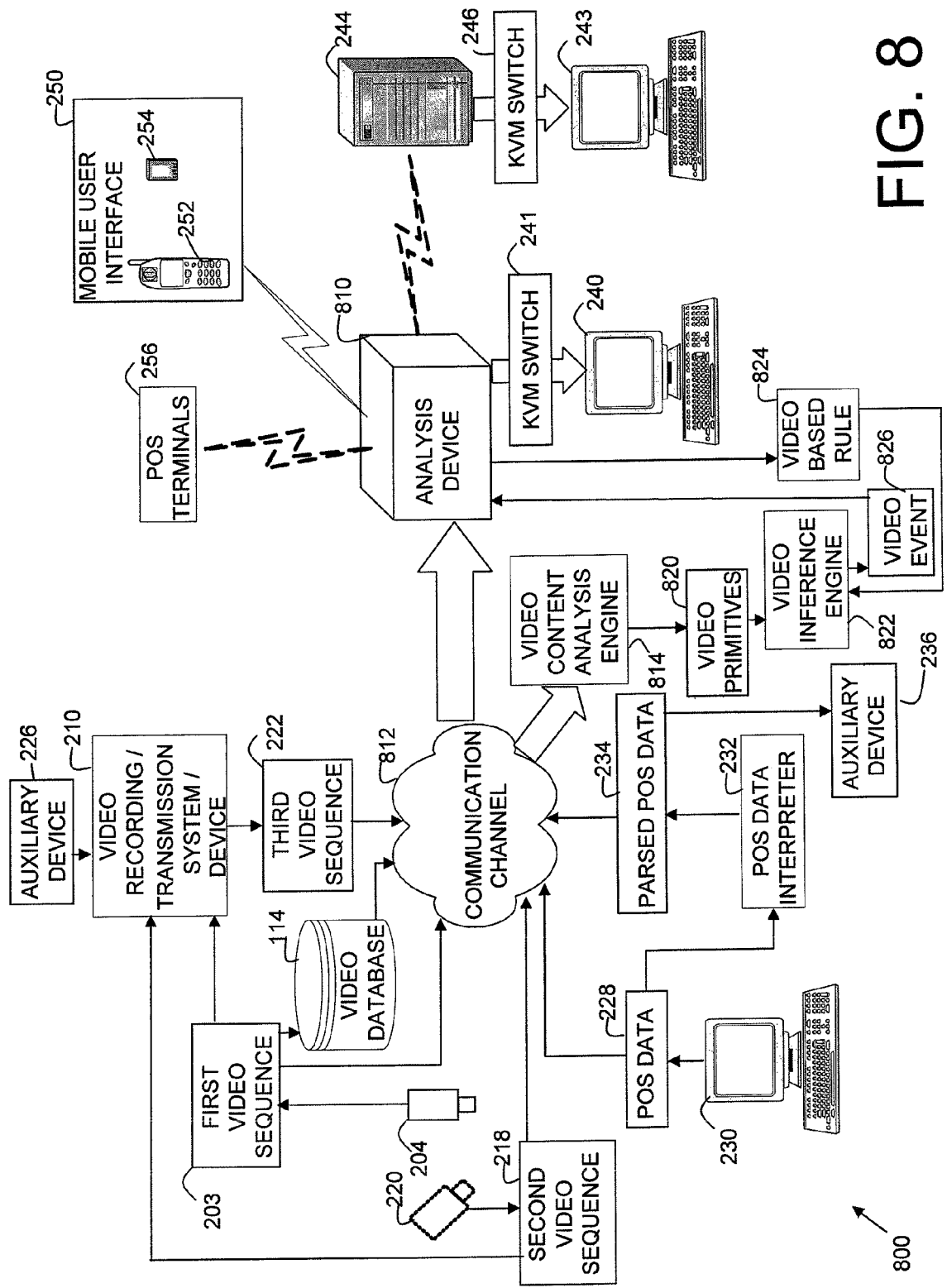
FIG. 8 is a diagrammatic illustration of an exemplary remote processing system according to an exemplary embodiment of the invention.

With continuing reference to FIGS. 5 and 6 and further reference to FIG. 8, in an exemplary remote processing system 800, the video and POS data may be sent for processing to a remote location. For example, the POS data 228 may be transmitted to an analysis device 810 via a communication channel 812. Optionally, the POS data 228 may be transmitted via the POS data interpreter 232 to the communication channel 812 and, consequently, to the analysis device 810. On request, video data of a corresponding POS transaction may be analyzed. The first video sequence 203 from the first video camera 204 and, optionally, the second video sequence 218 from the second video camera 220 may be sent to a video content analysis engine 814 via the communication channel 812. Optionally, the first and/or the second video sequence 203, 218 may be sent to the video device 210 as described above. The video device 210 may transmit the third video sequence 222 to the video content analysis engine 814 via the communication channel 812. The first, second and/or third video sequence 203, 218, 222 may include wireless video, Internet protocol (IP) video, analog video, or any other appropriate video format. In the embodiment of FIG. 8, the video data may be sent to the video content analysis engine 814 via the communication channel 812 from the video database 114 on request. Video primitives 820 may be sent to a video inference engine 822 for analysis based on video rules 824. Inferred video events 826 may be sent to the analysis device 810.

The analysis device 810 may be configured and operated locally by the local user interface 240 or via the remote terminal 243 using the web interface or remote desktop connection 244. Alternatively, the analysis device 810 may be configured and operated by the mobile device 250, such as the cell phone 252, PDA 254, or the like. The analysis device 810 may process the POS data and the video data from multiple POS terminals 256 at multiple locations.

Figure 9:
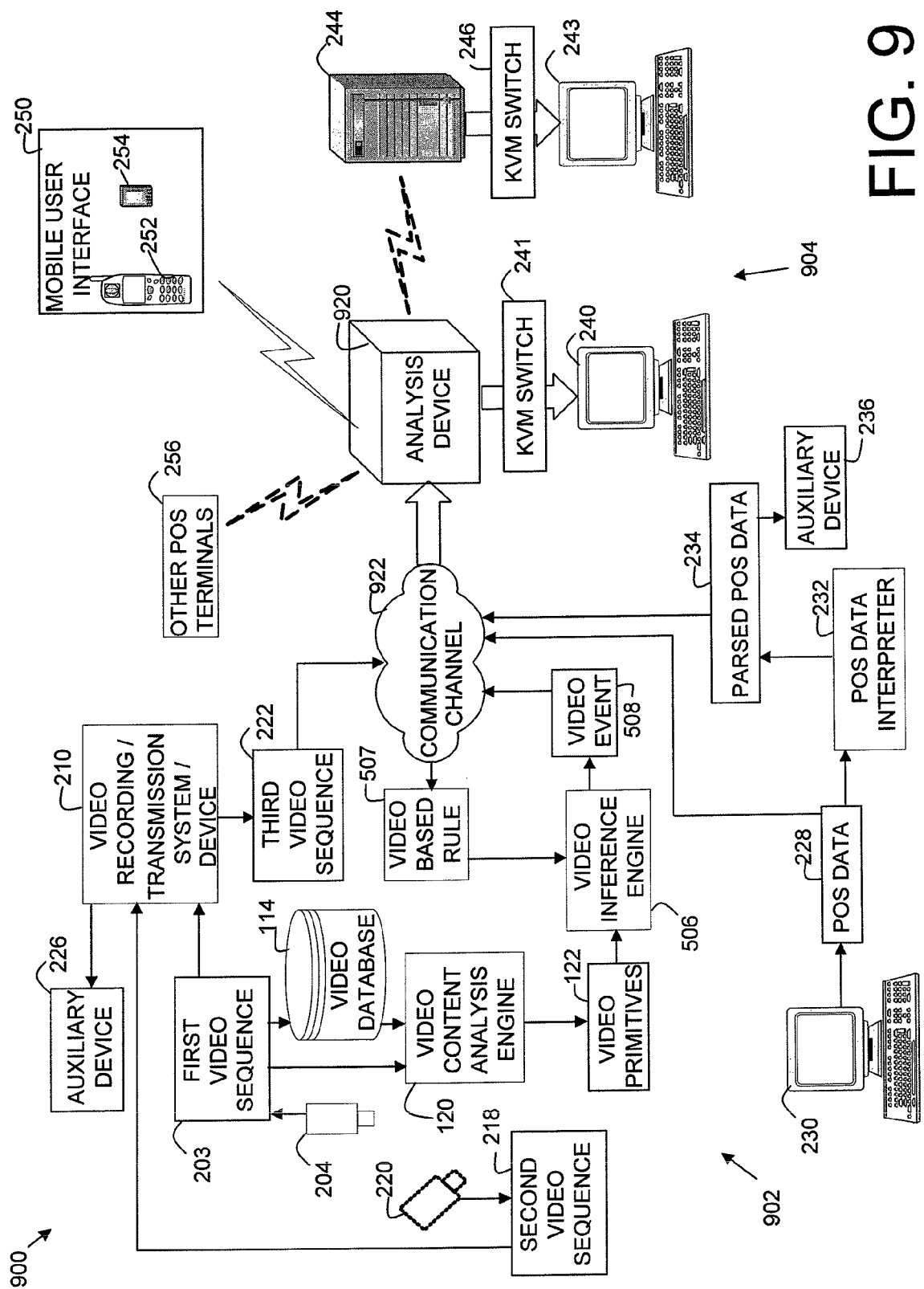
FIG. 9 is a diagrammatic illustration of an exemplary distributed processing system according to an exemplary embodiment of the invention.

With continuing reference to FIGS. 5 and 6 and further reference to FIG. 9, in an exemplary distributed processing system 900, the POS verification and analysis process described above may be split between local processing 902 and remote processing 904. An analysis device 920 may receive the POS data 228 from the POS terminal remotely via a communication channel 922. Optionally, the analysis device 920 may receive the parsed POS data 234 via the POS data interpreter 232. On request, video data of a corresponding POS transaction may be analyzed in the local processing 902. The video content analysis engine 120 may generate the video primitives 122. The video primitives 122 may be sent to the video inference engine 506, which, based on the video rules 507, may analyze the video primitives 122 and infer the video events 508. The video events 508 may be streamed to the analysis device 920 via the communication channel 922. In this embodiment, the bandwidth between the local and the remote locations may be controlled as explained above regarding FIG. 4. In addition, multiple back-end applications may be supported. Examples of such an architecture are discussed in U.S. Published Patent Application No. 2005/0169367, identified above.

Figure 10B:
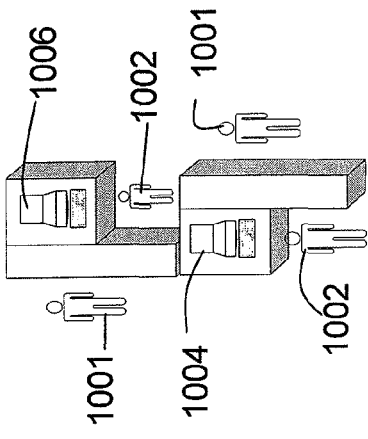
FIG. 10B is a diagrammatic illustration of an exemplary video camera configuration according to an exemplary embodiment of the invention.
Figure 10D:
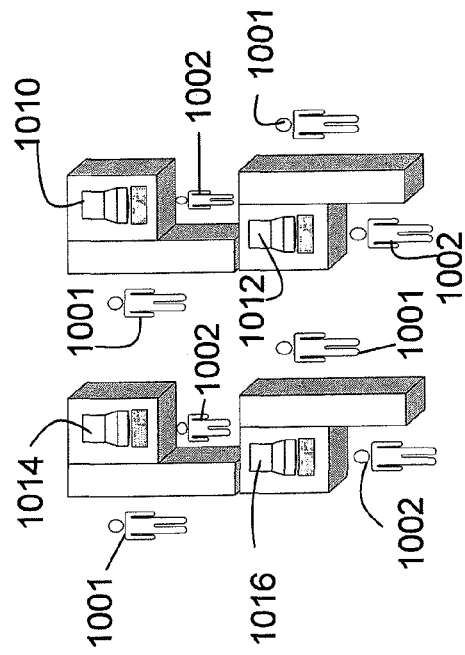
FIG. 10D is a diagrammatic illustration of an exemplary video camera configuration according to an exemplary embodiment of the invention.
Figure 10A:
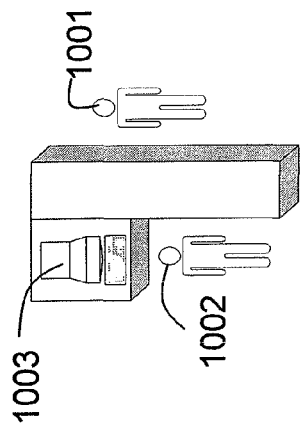
FIG. 10A is a diagrammatic illustration of an exemplary video camera configuration according to an exemplary embodiment of the invention.
Figure 10C:
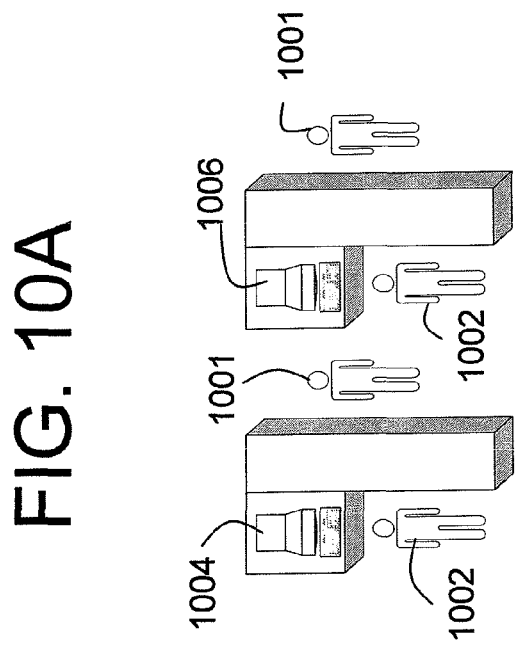
FIG. 10C is a diagrammatic illustration of an exemplary video camera configuration according to an exemplary embodiment of the invention.

With reference to FIGS. 10A, 10B, 10C and 10D, the POS transaction verification and analysis system 100, 500, 600 may include various video camera configurations depending on video camera optics and POS terminal layout. It is possible to tie multiple POS terminals to a single analysis video camera view to save infrastructure resources. As illustrated in FIG. 10A, the POS transactions verification and analysis system 100, 500, 600 may verify transactions between a customer 1001 and an employee 1002 at a single POS terminal 1003 in a single video camera view. As illustrated in FIGS. 10B and 10C, the POS transaction verification and analysis system 100, 500, 600 may verify transactions from two POS terminals 1004, 1006 in a single video camera view. As illustrated in FIG. 10D, the POS transaction verification and analysis system 100, 500, 600 may verify transactions from four POS terminals 1010, 1012, 1014, 1016 in a single video camera view. However, the application is not limited to the illustrated configurations. It is contemplated that different numbers of POS terminals may be observed in a single video camera view depending on application. In addition, the secondary video cameras may be configured independently from the primary video cameras. In an exemplary configuration there may be only a single primary camera covering multiple POS terminals, but a separate secondary camera for each terminal. In another exemplary configuration a single secondary camera may correspond to multiple primary cameras.

Figure 11:
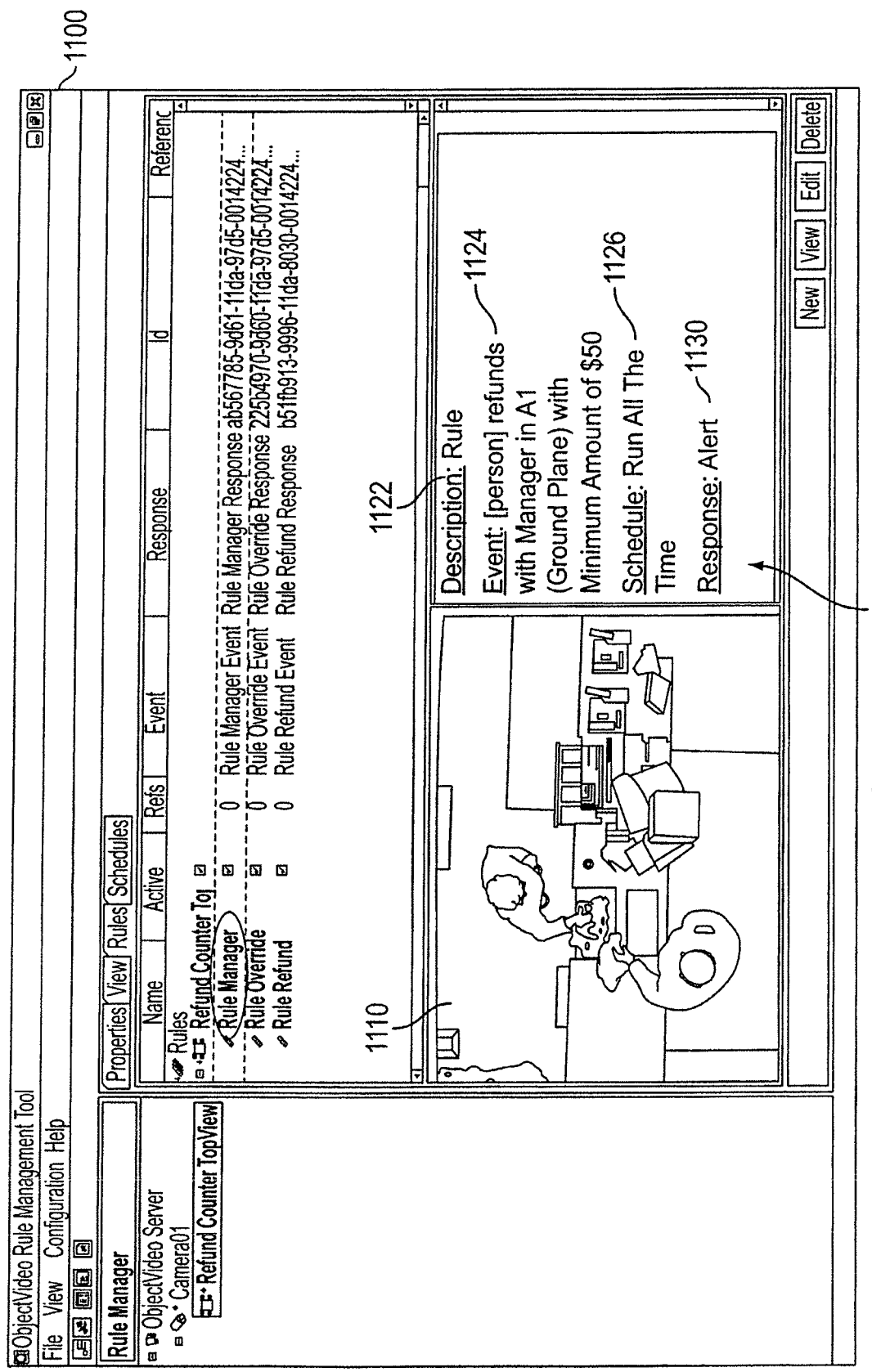
FIG. 11 is an image of an exemplary graphical user interface according to an exemplary embodiment of the invention.

With reference to FIG. 11, an exemplary user interface window or screen 1100 for defining an exceptional manager override rule is illustrated. An area of interest on the video image defines the area in which the employees are expected to operate. Text in a window 1120 may include a description 1122. An event description area 1124 may specify a number of persons to be present and a manager to be present when the refund is for more than $50. A schedule 1126 may specify for the rule to continuously run. A response 1130 may specify that an alert may be issued if the conditions of the rule are not satisfied such as when a refund transaction occurs with only one person present in the monitored area.

Figure 12:
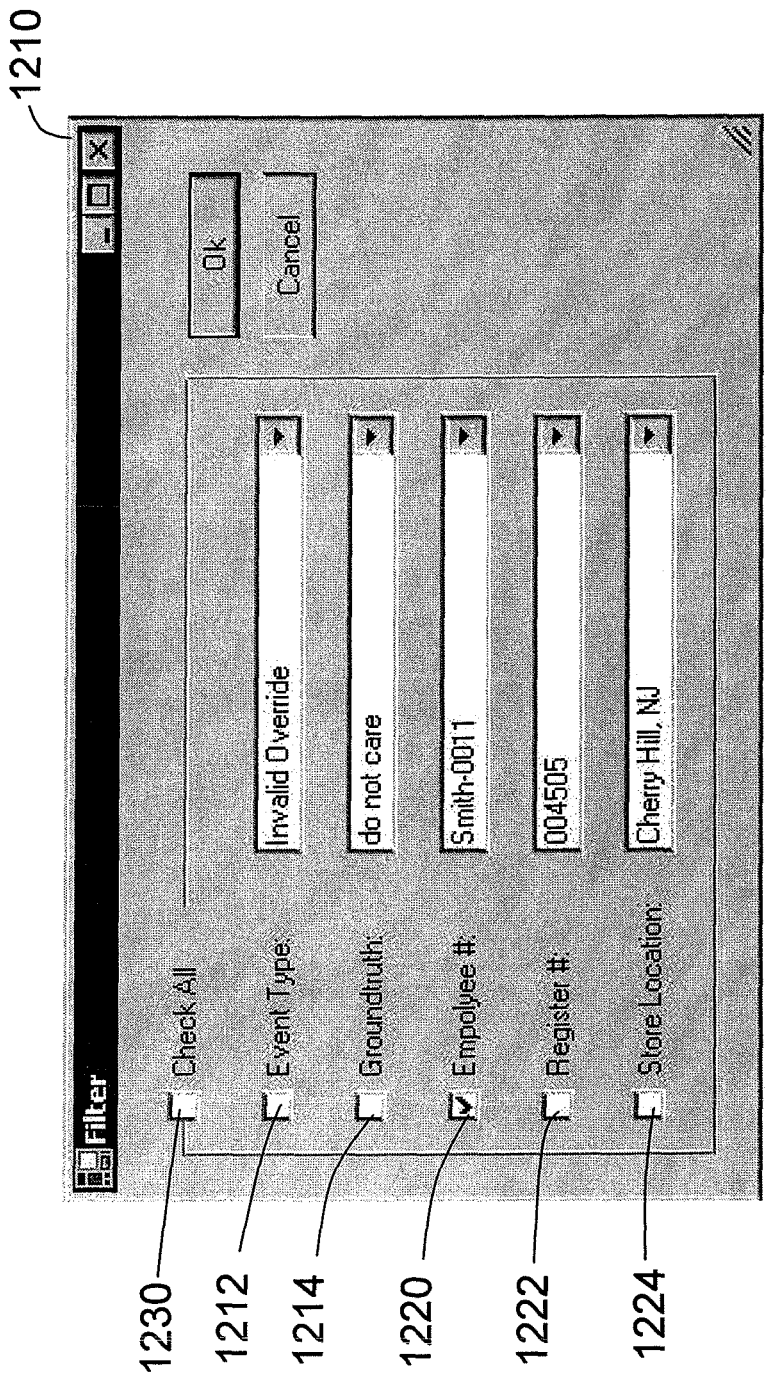
FIG. 12 is an image of an exemplary graphical user interface according to an exemplary embodiment of the invention.

With reference to FIG. 12, exemplary reports may be generated by querying the exceptional transaction database 146 as described above with reference to FIGS. 1, 5, and 6. A filtering tool 1210 may be used by an operator to request exceptional transactions fulfilling specific criteria. For example, the operator may checkmark a corresponding box to filter out transactions by an event type 1212, ground truth 1214, employee name/id 1220, register number 1222, or store location 1224. Of course, other appropriate criteria, such as time of day or a cash value, may be specified. By putting a checkmark in a box 1230, the operator may select all available criteria.

With reference to FIG. 13, an exemplary summary report 1300 may display the start date and time 1310 and the end date and time 1312, for which the summary report 1300 is generated. A line 1320 may display a name of an employee for whom the summary report 1300 is generated, e.g., Smith. A summary screen 1330 may display a summary of the detected exceptional activities for the selected employee, such as a number 1332 of invalid returns, a number 1334 of invalid overrides, a total number 1336 of exceptional transactions, a dollar value 1340 for invalid returns, a dollar value 1342 for invalid overrides, and a total dollar value 1344 for detected exceptional transactions. The event categories 1332, 1334, 1336 and dollar value categories 1340, 1342, 1344 may be further categorized into fraudulent events 1350, non-fraudulent events 1352 and "do not care" events 1354.

A summary report 1360 may display a summary of events for the selected employee. A summary report 1362 may display the POS registers 1364 from which the information was collected for the selected employee and corresponding events.

With reference to FIG. 14, a summary report 1410 may include a store name 1412, and total numbers 1414 for each type of inferred transaction events for the selected employee.

A report 1420 may display each alert notification 1422 received for the selected employee. The report 1420 may include date/time 1424 for each alert notification 1422, type of event 1426, a ground truth 1430, an item tag 1432, a dollar amount 1434, a receipt number 1436, an employee name/ID 1440, a register number 1442, and a store location 1444. Of course, it is contemplated that other reports including other categories may be generated. The reports may include one or more links back to the associated POS data and/or video data.

Embodiments of the invention may take forms that include hardware, software, firmware, and/or combinations thereof. Software may be received by a processor from a computer-readable medium, which may, for example, be a data storage medium (for example, but not limited to, a hard disk, a floppy disk, a flash drive, RAM, ROM, bubble memory, etc.), or it may be received on a signal carrying the software code on a communication medium, using an input/output (I/O) device, such as a wireless receiver, modem, etc. A data storage medium may be local or remote, and software code may be downloaded from a remote storage medium via a communication network.

The examples and embodiments described herein are non-limiting examples.

The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

The invention claimed is:

1. A non-transitory computer-readable medium comprising software that monitors a point of sale (POS) transaction at a POS terminal, which software, when executed by a computer system, causes the computer system to perform operations comprising:
   receiving non-video data regarding the POS transaction;
   defining one or more exceptional transaction rules based on one or more predetermined non-video POS data events;
   inferring that the POS transaction comprises a potentially exceptional transaction based on a corresponding one of the one or more exceptional transaction rules and the received non-video data;
   obtaining video data regarding the POS transaction, wherein the obtaining comprises one of:
     receiving the video data regarding the POS transaction from a video camera, and
     storing the video data regarding the POS transaction obtained by the video camera in an archive and receiving the video data regarding the POS transaction from the archive;
   generating one or more video primitives by processing the received video data regarding the POS transaction, the one or more video primitives comprising data descriptions of content of the received video data regarding the POS transaction; and
   determining that the inferred potentially exceptional transaction comprises a verified exceptional transaction by automatically analyzing the received video data regarding the POS transaction, wherein the determining includes:
     generating a video event based on the one or more video primitives and a corresponding video rule; and
     confirming the inferred potentially exceptional transaction as an exceptional transaction based on the generated video event.

2. The non-transitory computer-readable medium as set forth in claim 1, wherein receiving video data further includes:
   receiving auxiliary video data obtained by one or more auxiliary video cameras.

3. The non-transitory computer-readable medium as set forth in claim 1, wherein the operations further include:
   defining one or more policy violation rules based at least on one or more predetermined exceptional transactions; and
   determining a policy violation based on a corresponding policy violation rule of the one or more policy violation rules and at least one of the verified exception transaction or the potentially inferred exceptional transaction.

4. The non-transitory computer-readable medium as set forth in claim 3, wherein the operations further include:
   generating a policy violation report based on the determined policy violation.

5. The non-transitory computer-readable medium as set forth in claim 1, wherein the operations further include:
   generating an exceptional transaction report based on at least one of the verified exception transaction or the potentially inferred exceptional transaction.

6. A method for monitoring a point of sale (POS) transaction at a POS terminal, comprising:
   receiving non-video POS transaction data by one or more processors;
   defining, by the one or more processors, one or more exceptional transaction rules based on one or more predetermined video data events;
   inferring, by the one or more processors, that the POS transaction comprises a potentially exceptional transaction based on a corresponding one of the exceptional transaction rules and the received non-video POS transaction data;
   obtaining, by the one or more processors, video data regarding the POS, wherein obtaining comprises one of:
     receiving, by the one or more processors, the video data regarding the POS transaction from a video camera, and
     storing the video data regarding the POS transaction obtained by the video camera in an archive and receiving, by the one or more processors, the video data regarding the POS transaction from the archive;
   generating, by the one or more processors, one or more video primitives by processing the received video data regarding the POS transaction, the one or more video primitives comprising data descriptions of content of the received video data regarding the POS transaction; and
   determining, by the or more processors, that the inferred potentially exceptional transaction comprises a verified exceptional transaction by automatically analyzing the video data regarding the POS transaction, wherein the determining includes:
     generating, by the one or more processors, a video event based on the one or more video primitives and corresponding video rule; and
     confirming, by the one or more processors, the inferred potentially exceptional transaction as an exceptional transaction based on the generated video event.

7. The method for monitoring a point of sale (POS) transaction according to claim 6, wherein the method is performed locally.

8. The method for monitoring a point of sale (POS) transaction according to claim 6, wherein the method further includes:

receiving the non-video POS transaction data via a communication channel at a remote location;

defining, at the remote location, the one or more exceptional transactions rules based on one or more predetermined non-video data events and the one or more predetermined video data events; and inferring, at the remote location, the potentially exceptional transaction.

9. The method for monitoring a point of sale (POS) transaction according to claim 8, wherein the method further includes:

requesting transmission of the video data regarding the POS transaction to the remote location;

receiving, at the remote location, the video data regarding the POS transaction via the communication channel;

generating, at the remote location, video primitives based on the received video data;

generating, at the remote location, a video event based on a video rule and the video primitives; and confirming, at the remote location, the inferred potentially exceptional transaction based on the video event.

10. A method comprising:

downloading software or providing downloadable software to a computer system, the computer system comprising one or more processors, which software, when executed by the one or more processors, causes the computer system to perform operations comprising:

receiving non-video data regarding a point of sale (POS) transaction;

generating one or more POS primitives by processing the received non-video POS data the one or more POS primitives comprising data descriptions of the content of the received non-video POS data;

receiving video data regarding the corresponding POS transaction;

processing the received video data to generate one or more video primitives using the first or a second computer processor, the one or more video primitives being data descriptions of the content of the received video data;

defining one or more exceptional transaction rules based on at least one predetermined video data event and at least one predetermined non-video data event; and inferring an exceptional transaction based on a corresponding one of the one or more exceptional transaction rules and at least one of the one or more POS primitives or at least one of the one or more video primitives.

11. A method comprising at least one of:

downloading software to a computer system, which software, when executed by the computer system, causes the computer system to perform operations comprising the method of claim 6; or providing downloadable software to a computer system, which software, when executed by the computer system, causes the computer system to perform operations comprising the method of claim 6.

* * * * *